(12) United States Patent
Harada et al.

(10) Patent No.: US 8,729,153 B2
(45) Date of Patent: May 20, 2014

(54) AQUEOUS PIGMENT DISPERSION FOR INK-JET INK AND INK-JET INK COMPOSITION

(75) Inventors: Hiroshi Harada, Ageo (JP); Sadahiro Inoue, Toda (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 1173 days.

(21) Appl. No.: 10/570,891

(22) PCT Filed: Sep. 10, 2004

(86) PCT No.: PCT/JP2004/013596
§ 371 (c)(1),
(2), (4) Date: Mar. 7, 2006

(87) PCT Pub. No.: WO2005/026271
PCT Pub. Date: Mar. 24, 2005

(65) Prior Publication Data
US 2007/0037900 A1 Feb. 15, 2007

(30) Foreign Application Priority Data
Sep. 11, 2003 (JP) ................................. 2003-319654

(51) Int. Cl.
| | | |
|---|---|---|
| *B60C 1/00* | (2006.01) |
| *C08F 297/02* | (2006.01) |
| *C08J 3/00* | (2006.01) |
| *C08K 5/34* | (2006.01) |
| *C08K 5/48* | (2006.01) |
| *C08K 5/3492* | (2006.01) |
| *C08L 25/00* | (2006.01) |
| *C08L 31/00* | (2006.01) |
| *C08L 33/00* | (2006.01) |
| *C09B 67/00* | (2006.01) |
| *C09D 5/00* | (2006.01) |
| *C09D 5/02* | (2006.01) |
| *C09D 11/00* | (2006.01) |

(52) U.S. Cl.
USPC ............. 523/160; 523/161; 524/90; 524/100; 524/191; 524/556; 524/577

(58) Field of Classification Search
USPC ............ 523/160, 161; 524/90, 100, 191, 556, 524/577
See application file for complete search history.

(56) References Cited

U.S. PATENT DOCUMENTS

| | | | | |
|---|---|---|---|---|
| 5,141,556 | A | * | 8/1992 | Matrick ........................ 524/385 |
| 5,549,740 | A | | 8/1996 | Takahashi et al. |
| 5,939,469 | A | * | 8/1999 | Fussnegger et al. .......... 523/161 |
| 6,132,501 | A | * | 10/2000 | Scaringe et al. ............ 106/31.75 |
| 6,399,674 | B1 | * | 6/2002 | Kashiwazaki et al. ........ 523/161 |

FOREIGN PATENT DOCUMENTS

| | | |
|---|---|---|
| EP | 0 908 496 A1 | 4/1999 |
| EP | 1 256 459 A2 | 11/2002 |
| JP | 7-126546 | 5/1995 |
| JP | 8-80664 | 3/1996 |
| JP | 8-253716 | 10/1996 |
| JP | 9-157564 | 6/1997 |
| JP | 10-158555 | 6/1998 |
| JP | 11-199811 | 7/1999 |
| JP | 2000-109733 A | 4/2000 |
| JP | 2001-81369 | 3/2001 |
| JP | 2001-98200 | 4/2001 |
| JP | 2000-109733 A | 8/2001 |
| JP | 2002-226738 | 8/2002 |
| JP | 2003-48367 | 2/2003 |
| JP | 2003-176427 | 6/2003 |
| JP | 2003-226832 | 8/2003 |
| JP | 2003-253188 | 9/2003 |

OTHER PUBLICATIONS

Machine Translation of JP 2003-253188, Koichi et al., Sep. 10, 2003.*
Rapold, Roland F. et al., "Conformational Characteristics of Polystyrene", Macromol. Theory Simul. 3, No. 1, Jan. 1994, pp. 1-17.*
Machine English Translation of JP 2003-253188, Koichi et al., Sep. 2003.*
Korean Search Report Patent Appln. No. 10-2006-7004870, dated Mar. 2, 2011.
Korean Office Action, issued in Patent Application No. 10-2006-7004870, dated Mar. 2, 2011.

* cited by examiner

*Primary Examiner* — Patrick Niland
(74) *Attorney, Agent, or Firm* — Edwards Wildman Palmer LLP; James E. Armstrong, IV; Nicholas J. DiCeglie, Jr.

(57) ABSTRACT

An aqueous pigment dispersion which contains C.I. Pigment Yellow 74, a styrene-acrylic-based resin with an acid number of 100 to 250, and a basic compound, wherein the styrene-acrylic-based resin includes at least styrene-based monomer units, acrylic acid monomer units, and methacrylic acid monomer units as component monomer units, and the weight average molecular weight of the resin is within a range from 7,000 to 15,000.

7 Claims, No Drawings

AQUEOUS PIGMENT DISPERSION FOR INK-JET INK AND INK-JET INK COMPOSITION

TECHNICAL FIELD

The present invention relates to an aqueous dispersion of an organic pigment, and an ink-jet ink composition that uses such a dispersion.

BACKGROUND ART

Conventionally, ink-jet inks are used in which a colorant has been either dissolved or dispersed within a liquid medium containing water as the primary component. With these inks, if the colorant is a dye, then the water resistance and lightfastness of the image following printing is poor, and the ink cannot be used in outdoor applications or the like.

On the other hand, ink compositions in which the colorant is a pigment with excellent lightfastness are widely used for black inks that use carbon black.

However, in order to enable the use of aqueous ink compositions containing dispersed organic pigments, and particularly chromatic colored organic pigments, in the formation of multicolored images, a favorable color strength for the ink-jet ink, and a hue that can be combined with other colored inks to form an image with favorable color reproducibility are both important factors, and a variety of pigments which have different hue are being investigated for use within ink-jet recording.

A multitude of pigments are being investigated for yellow ink-jet inks, including pigment yellow 3, 12, 13, 14, 17, 24, 34, 35, 37, 42, 53, 55, 74, 81, 83, 95, 97, 98, 100, 101, 104, 108, 109, 110,117, 120, 138, 147, 151,153, 180, and 181. However, as for these pogments, not many can necessarily be used favorably for ink-jet inks.

In order for aqueous ink-jet ink compositions with these yellow organic pigments dispersed therein to be able to offer at least an equivalent level of practicality to dye inks, while also taking advantage of the characteristics provided by the pigments, the pigments must be grinded very finely so that no coarse particles capable of impeding the ink-jet ejecting exist in the ink, and the inks need to provide similar long-term ejecting stability and storage stability to that provided by dye-type inks. However in many cases, yellow pigments that exhibit excellent hue and color strength, and suffer no particular problems within normal applications suffer from inadequate dispersibility, storage stability, and/or discharge stability if used within ink-jet inks, meaning they cannot be used for ink-jet applications.

Furthermore, because many yellow pigments are prone to problems of lightfastness, an ideal pigment cannot be necessarily selected solely on the basis of the hue immediately after image formation. Moreover, depending on the pigment, crystal growth during synthesis can increase the size of the primary particles, causing a deterioration in the transparency of the coloring, or a worsening of the ink ejecting properties. Therefore, depending on the pigment used, the addition of a dispersion assistant to the ink composition may also need to be considered (see patent reference 1: Japanese Unexamined Patent Application, First Publication No. Hei 10-158555, patent reference 2: Japanese Unexamined Patent Application, First Publication No. 2001-98200, patent reference 3: Japanese Unexamined Patent Application, First Publication No. Hei 7-126546, and patent reference 4: Japanese Unexamined Patent Application, First Publication No. 2003-253188).

Accordingly, in a yellow ink-jet ink composition, selecting a yellow pigment that totally satisfies the required levels of color strength, hue, lightfastness, and storage stability and the like is extremely difficult, and conventionally, a pigment that provides a favorable balance across the above characteristics is selected, and any drawbacks associated with the pigment are covered by adjusting the ink blend or the production method to enable the composition to be used as an ink-jet ink.

For example, an improvement in the lightfastness of C.I. Pigment Yellow 74 by adding a styrene-(meth)acrylic acid-based water-soluble resin has been reported (see patent reference 5: Japanese Unexamined Patent Application, First Publication No. Hei 11-199811).

For example, by using C.I. Pigment Yellow 128 in combination with Pigment Yellow 110, favorable wide color reproducibility across a wide range is achieved (see patent reference 6: Japanese Unexamined Patent Application, First Publication No. 2001-81369).

For example, by using C.I. Pigment Yellow 93 in combination with a styrene-acrylic acid-based copolymer and an acetylene glycol compound, the ejecting properties and storage stability are improved (see patent reference 7: Japanese Unexamined Patent Application, First Publication No. 2002-226738).

As for the above characteristics, dispersibility and storage stability are particularly important, as they directly affect the ink ejecting, and favorable storage stability at high pigment concentrations is necessary for ensuring favorable color reproducibility.

Accordingly, a variety of dispersants and dispersion methods are being investigated to improve the dispersibility and storage stability of aqueous pigment dispersions.

For example, a polymer of acrylic acid, styrene, and a-methylstyrene has been used to improve the ejecting stability at the nozzle and the water-resistance of the printed image for an ink-jet ink containing an azo-system organic pigment (see patent reference 8: Japanese Unexamined Patent Application, First Publication No. Hei 8-253716).

For example, the content of 0.01 to 5% by weight of either a polymer containing carboxyl groups, with an acid number of 50 to 700, or a polymer containing carboxylate salt groups has been disclosed, and styrene-maleic anhydride, a hydrolysis product of styrene-maleic anhydride, or a salt or ester thereof is used as the polymer (see patent reference 9: Japanese Unexamined Patent Application, First Publication No. Hei 9-157564).

For example, a solid kneaded material can be prepared by conducting high-viscosity kneading using a styrene-acrylic resin together with a pigment, a basic compound, and a wetting agent, thereby yielding an aqueous pigment dispersion with favorable storage stability that can be used as an ink composition for ink-jet recording, wherein a resin in which the monomer composition ratio is styrene/methacrylic acid/acrylic acid=77/13/10 (weight ratio), and the weight average molecular weight is within a range from 3,000 to 50,000 can be used as the styrene-acrylic resin (see patent reference 10: Japanese Unexamined Patent Application, First Publication No. 2003-226832).

In this manner, in order to take advantage of the color strength and water resistance of pigments, while also achieving levels of storage stability and ejecting stability similar to those of dye inks, it is important that, firstly, a yellow pigment with a favorable balance of characteristics is selected, and this pigment must then be combined with the most appropriate resin for that pigment in order to impart superior levels of dispersibility and storage stability.

However, many of the references relating to resin dispersants, including those listed above, disclose only general comment relating to resins as dispersants for use within ink-jet inks or aqueous dispersions, and no mention is made of selection of the most appropriate yellow pigment when any of the various resin dispersants is combined with a yellow pigment.

By selecting the most appropriate combination of yellow pigment and resin dispersant, and then optimizing factors such as the composition, molecular weight and blending of the resin dispersant, a yellow aqueous pigment dispersion with excellent levels of storage stability and dispersibility can be prepared. However, this type of detailed investigation has yet to be conducted for all of the various yellow pigments, and well-balanced aqueous pigment dispersions which provide excellent color strength, lightfastness, and color reproducibility, while also offering favorable dispersibility and storage stability are keenly sought.

Particularly in the case of aqueous pigment dispersions available to ink-jet inks for thermal jet systems, excellent storage stability during high-temperature storage is also preferred, but a yellow ink-jet ink composition that provides excellent color strength, lightfastness, and color reproducibility, while also exhibiting this type of superior storage stability has yet to be reported.

An object of the present invention is to provide a well-balanced aqueous pigment dispersion that uses a yellow pigment, which has favorable dispersibility and storage stability, excellent color strength, lightfastness, water resistance and ejecting stability, and can be used for preparing an ink-jet ink. In addition, an object of the present invention is to provide an aqueous pigment dispersion which in addition to the performance factors described above, also exhibits favorable storage properties at high temperature, and can be used for preparing a thermal jet-type ink-jet ink with favorable discharge stability.

BEST MODE FOR CARRYING OUT THE INVENTION

The inventors of the present invention investigated favorable combinations of yellow pigments and dispersion resins, and ascertained which properties and blend compositions for the dispersion resins were the most important factors in realizing favorable ink-jet inks and aqueous pigment dispersions, and then conducted further investigations into optimizing those factors, thus completing the present invention.

The present invention is an aqueous pigment dispersion for an ink-jet ink that contains C.I. Pigment Yellow 74, a styrene-acrylic-based resin with an acid number of 100 to 250, and a basic compound, wherein the styrene-acrylic-based resin contains at least styrene-based monomer units, acrylic acid monomer units, and methacrylic acid monomer units as component monomer units, the proportion of the styrene-based monomer units relative to the combined total of all the monomer units is at least 50% by weight, the sum of the styrene-based monomer units, acrylic acid monomer units, and methacrylic acid monomer units relative to the combined total of all the monomer units is at least 95% by weight, and the weight average molecular weight of the resin is within a range from 7,000 to 15,000.

An aqueous pigment dispersion of the present invention uses a combination of C.I. Pigment Yellow 74, which exhibits favorable color strength and color reproducibility, and a styrene-acrylic-based resin with an acid number of 100 to 250, and by adding a basic compound to this combination, an aqueous pigment dispersion with a favorable balance of properties can be prepared, which retains the color strength and color reproducibility of the pigment, exhibits excellent dispersibility and storage stability, and is capable of preparing an ink-jet ink with favorable lightfastness. Because the selection of the monomers for the aforementioned styrene-acrylic-based resin and the respective blend proportions of those monomers are optimized for the C.I. Pigment Yellow 74, the aqueous pigment dispersion exhibits extremely good storage stability as well as excellent storage stability during high-temperature storage, and can be used for preparing a thermal jet-type ink-jet ink with favorable ejecting stability.

In other words, as a result of the hydrophobicity of the predominant styrene-based monomer, the aforementioned styrene-acrylic-based resin adsorbs favorably to the pigment surface of the C.I. Pigment Yellow 74, thereby coating the pigment surface and preventing any increase in the particle size of the aggregation-prone pigment, whereas the addition of the basic compound imparts favorable dispersibility to the styrene-acrylic-based resin, enabling the resin to encapsulate the pigment while dispersing uniformly through the aqueous medium. By optimizing the balance between the hydrophobic component and hydrophilic component of the styrene-acrylic-based resin to best suit the C.I. pigment yellow 74, the inventors of the present invention were able to achieve an aqueous pigment dispersion with favorable levels of color strength, dispersibility, and storage stability. An ink-jet ink that contains this aqueous pigment dispersion as a primary component exhibits favorable water resistance as a result of the large ratio of the styrene-based monomer, and has also been shown to provide improved image density.

In addition, the present invention also provides an ink-jet ink composition that contains the aforementioned aqueous pigment dispersion for an ink-jet ink as a primary component.

An aqueous pigment dispersion of the present invention exhibits excellent storage stability, and an ink-jet ink that contains such an aqueous pigment dispersion as the primary component exhibits a favorable balance between characteristics, with excellent levels of storage stability, ejecting stability, lightfastness and color strength, and by using this ink composition, high quality image with excellent water resistance can be printed with minimal bleeding, even on plain paper. In addition, even when used in a thermal jet-type printer, stable ink ejecting can still be obtained.

DETAILED DESCRIPTION OF THE INVENTION

As follows is a more detailed description of an aqueous pigment dispersion of the present invention, and an ink-jet ink composition that uses the same.

The yellow pigment C.I. Pigment Yellow 74 used in the present invention exhibits excellent hue with high transparency, and excellent color tone balance for secondary colors, which is an important factor when used as a process color in full-color printing, and is used as a favorable yellow pigment within ink-jet ink compositions.

When used within a pigment dispersion of the present invention, the C.I. Pigment Yellow 74 can be used in any form, including a suitably dried powder, granules, a paste, or a water-containing slurry, although in order to ensure a favorable effect on the dispersion state of the aqueous pigment dispersion of the present invention, the particle size distribution of the pigment, expressed as a volumetric average particle size within the aqueous pigment dispersion, is preferably no more than 0.5 micrometers, with particle sizes of 0.2 micrometers or less being even more desirable.

Other pigments may also be used in combination with the C.I. Pigment Yellow 74, provided their addition does not impair the dispersibility, the storage stability, or the hue vividness. Suitable examples of other pigments that can be used in combination include azo pigments such as the various azo lake pigments, insoluble monoazo pigments, insoluble disazo pigments, and condensed azo pigments, as well as condensed polycyclic pigments such as anthraquinone-based pigments, thioindigo pigments, perinone pigments, perylene pigments, quinacridone pigments, and quinophthalone pigments, and isoindolinone pigments.

Other requirements such as color tone can also effect the selection of the pigment, and the present invention is not necessarily limited to the pigments listed above.

The styrene-acrylic-based resin used in the aqueous pigment dispersion of the present invention contains styrene-based monomer units, acrylic acid monomer units, and methacrylic acid monomer units as essential components.

In addition, the proportion of the styrene-based monomer units that represent one of the essential components, relative to the combined total of all the monomer units must be at least 50% by weight, and the sum of the styrene-based monomer units, acrylic acid monomer units, and methacrylic acid monomer units relative to the combined total of all the monomer units must be at least 95% by weight.

Because the proportion of the styrene-based monomer units relative to the combined total of all the monomer units is at least 50% by weight, the styrene-acrylic-based resin used in the aqueous pigment dispersion of the present invention exhibits favorable adsorption to hydrophobic pigment surfaces, meaning the resin can be adsorbed effectively to the surface of the C.I. Pigment Yellow 74. If this proportion is less than 50% by weight, the adsorption of the resin to the pigment surface tends to be inadequate, and the storage stability of the aqueous pigment dispersion tends to be prone to deterioration. Furthermore, the recording image density printed on plain paper and the like for an ink-jet ink prepared from the aqueous pigment dispersion tends to deteriorate, meaning the print quality is prone to deterioration. In addition, the water resistance of the ink-jet ink also tends to deteriorate. Moreover, by ensuring that the sum of the styrene-based monomer units, acrylic acid monomer units, and methacrylic acid monomer units is at least 95% by weight relative to the combined total of all the monomer units, the quantity of the styrene-based monomer units can be further increased while still ensuring an acid number within a range from 100 to 250, enabling the dispersibility to be improved even more.

Examples of the styrene-based monomer include styrene, alkylstyrenes such as α-methylstyrene, β-methylstyrene, 2,4-dimethylstyrene, α-ethylstyrene, α-butylstyrene, and α-hexylstyrene, halogenated styrenes such as 4-chlorostyrene and 3-bromostyrene, as well as 3-nitrostyrene, 4-methoxystyrene and vinyltoluene, although styrene is preferred.

In addition to the styrene-based monomer and the (meth)acrylic acid monomers, the styrene-acrylic-based resin used in the aqueous pigment dispersion of the present invention may also include various vinyl group-containing derivatives capable of copolymerization with the styrene-based monomer and the (meth)acrylic acid monomers.

Examples of the various vinyl group-containing derivatives that can be used include unsaturated esters such as methyl acrylate, ethyl acrylate, propyl acrylate, n-butyl acrylate, t-butyl acrylate, 2-ethylhexyl acrylate, octyl acrylate, stearyl acrylate, benzyl acrylate, p-tolyl acrylate, hydroxyethyl acrylate, hydroxypropyl acrylate, methyl methacrylate, ethyl methacrylate, propyl methacrylate, n-butyl methacrylate, t-butyl methacrylate, 2-ethylhexyl methacrylate, octyl methacrylate, stearyl methacrylate, benzyl methacrylate, p-tolyl methacrylate, hydroxyethyl methacrylate, hydroxypropyl methacrylate, cyclohexyl methacrylate, dimethyl maleate, monoethyl maleate, diethyl maleate, di-n-butyl maleate, bis(2-ehtylhexyl) maleate, vinyl acetate, vinyl propionate, vinyl butyrate, vinyl hexanoate, vinyl benzoate, vinyl stearate, vinyl acrylate, vinyl methacrylate, allyl acetate, allyl propionate, allyl n-butyrate, allyl heptanoate, allyl phenoxyacetate, and allyl methacrylate; unsaturated amides such as acrylamide, N,N-dimethylacrylamide, N-isopropylacrylamide, N-t-butylacrylamide, N-(butoxymethyl) acrylamide, methacrylamide, and N-[(3-dimethylamino)propyl]methacrylamide; unsaturated nitrites such as acrylonitrile, methacrylonitrile, and 3-hydroxypropionitrile; unsaturated ethers such as ethyl vinyl ether, propyl vinyl ether, n-butyl vinyl ether, t-butyl vinyl ether, cyclohexyl vinyl ether, 2-ethylhexyl vinyl ether, ethylene glycol vinyl ether, and di(ethylene glycol) divinyl ether; and heterocyclic vinyl compounds such as 2-vinylpyridine, 4-vinylpyridine, N-vinylcarbazole, and N-vinylpyrrolidone. The selection of copolymerizable monomer components is not necessarily limited to the examples presented above.

In this description, the term "(meth)acrylic acid monomers" includes both acrylic acid monomers and methacrylic acid monomers.

In the composition of the aforementioned styrene-acrylic-based resin, the proportion of the styrene-based monomer is preferably within a range from 60 to 90% by weight, and even more preferably from 70 to 80% by weight.

In addition, the sum of all the hydrophilic monomer units other than the acrylic acid and methacrylic acid is preferably no more than 2% by weight relative to the combined total of all the monomer units, and resins which contain essentially no such monomers are the most preferred. Here, the description "contains essentially no hydrophilic such monomers" means the quantity of such hydrophilic monomers is less than the quantity required to cause any effect on the characteristics of the copolymer resin, and typically refers to a quantity of no more than approximately 0.5% by weight.

Examples of these hydrophilic monomers whose use is restricted within styrene-acrylic-based resins of the present invention include monomers that contain a hydrophilic substituent group such as a hydroxyl group, sulfonic group, amino group or quaternary ammonium group within the monomer chemical structure, as well as monomers that include repeating ethylene oxide or propylene oxide units. By using a resin that contains essentially none of these hydrophilic monomers, the water resistance of the ink-jet printed image improves even further from immediately after printing.

The styrene-acrylic-based resin used in an aqueous pigment dispersion of the present invention is produced by copolymerization of the above monomer units, either in a single batch or in multiple stages. Synthesis of the resin can be conducted using a conventional method such as a bulk polymerization method, solution polymerization method, suspension polymerization method, or emulsion polymerization method.

More specifically, in the case of a solution polymerization method, for example, a copolymerized resin can be produced by mixing the monomer components together within any of various solvents as required, adding a compound such as a radical reaction initiator, and then controlling the reaction temperature. The reaction is typically conducted at a temperature of 20 to 100° C. for a period of 1 to 10 hours, if required under an atmosphere of an inert gas, with appropriate reaction conditions being selected in accordance with the type of solvents used, the type of monomers used, the type of initiator used, and the polymerization degree of the resin. Following completion of the polymerization reaction, the resin can be concentrated or isolated by reprecipitation from the reaction mixture and/or removal of the solvent.

The molecular weight of the resin is an important factor for ink-jet applications of the present invention, and a weight average molecular weight within a range from 7,000 to 15,000 is selected. The reason for this selection is that if the molecular weight exceeds 15,000 when C.I. Pigment Yellow 74 is used as the pigment, then the viscosity for preparing the aqueous pigment dispersion tends to become overly high, increasing the likelihood of a deleterious effect on the ink-jet ink ejecting, and particularly the ink-jet ejecting at a thermal system. If the molecular weight is less than 7,000, the stability of the targeted dispersion of pigment particles tends to be prone to deterioration.

In this description, the term weight average molecular weight refers to a value measured using GPC (gel permeation chromatography), and is a reduced value refer to the molecular weight of polystyrene standard materials. The weight average molecular weights of the resins used in the present invention were measured using the apparatus and conditions described below.

Pump unit: product name "LC-9A", manufactured by Shimadzu Corporation, system controller: product name "SIL-6B", manufactured by Shimadzu Corporation, auto-injector: product name "SIL-6B", manufactured by Shimadzu Corporation, detector: product name "RID-6A", manufactured by Shimadzu Corporation, data processing software: product name "Sic480II data station", manufactured by System Instruments Co., Ltd.

Columns: product names "GL-R400 (guard column)"+ "GL-R440"+"GL-R450"+"GL-R400M" manufactured by Hitachi Chemical Co., Ltd., eluting solvent: THF, elution rate: 2 ml/min., column temperature: 35° C.

The acid number of a resin of the present invention is within a range from 100 to 250, and is preferably from 100 to 200. The reason for this requirement is that if the acid number is set to a value higher than 250, the quantity of the hydrophobic component thought to adsorb preferentially to the surface of the C.I. Pigment Yellow 74 decreases, making resin coating by the styrene-acrylic-based resin less likely, and resulting in a tendency for the dispersibility of the aqueous pigment dispersion to deteriorate, whereas if the acid number is set to a value less than 100, the dispersibility improvement effect generated by neutralization of the acid number by the basic component diminishes, which also results in a tendency for the dispersibility of the aqueous pigment dispersion to deteriorate.

The glass transition temperature of an aqueous pigment dispersion of the present invention is preferably at least 90° C., and is most preferably within a range from 100 to 150° C. Ensuring this glass transition temperature is at least 90° C. enables a favorable balance to be more readily achieved between the ejecting stability, the storage stability, and the print quality, and is consequently preferred. A glass transition temperature of at least 90° C. is particularly favorable when the dispersion is used as an ink-jet ink for a thermal jet-type system.

In an aqueous pigment dispersion of the present invention, although the dispersibility and storage stability of the C.I. Pigment Yellow 74 are enhanced by the styrene-acrylic-based resin of the aforementioned specific composition, a sulfonic acid group-containing acetoacetic acid arylamide-based monoazo compound represented by a general formula (1) or (2) shown below is preferably also used as a dispersion assistant.

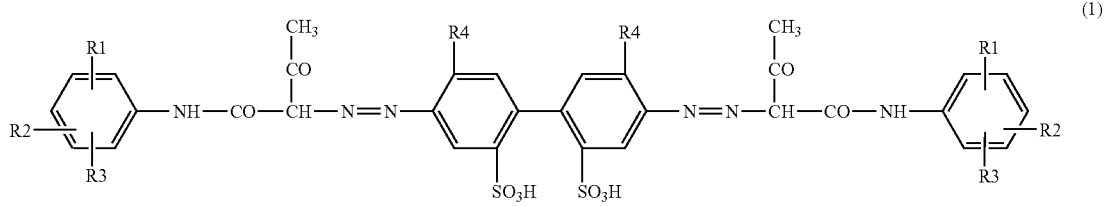

(1)

(wherein, R1, R2 and R3 each represent, independently, a hydrogen atom, methyl group, methoxy group, ethoxy group or chloro group, and R4 represents a methyl group or methoxy group)

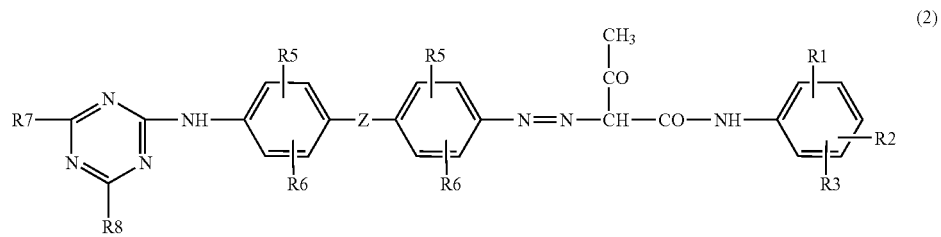

(2)

(wherein, R1, R2 and R3 each represent, independently, a hydrogen atom, methyl group, methoxy group, ethoxy group or chloro group, R5 and R6 each represent, independently, a hydrogen atom, methyl group, ethyl group, methoxy group, ethoxy group or hydroxyl group, R7 and R8 represent either a group represented by the formula —NH—Y—SO$_3$H or a hydroxyl group, although at least one of R7 and R8 is a group represented by —NH—Y—SO$_3$H, Y represents an ethylene group, phenylene group or naphthalene group, and Z represents one of the bivalent linkage groups represented by the general formulas (3) shown below)

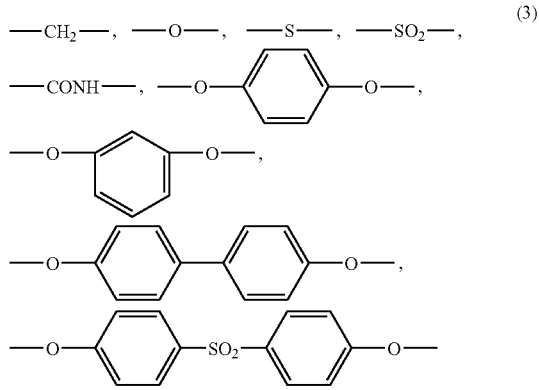
(3)

These compounds have a similar acetoacetic acid arylamide structure to the C.I. Pigment Yellow 74, and exhibit excellent adsorption to the Yellow 74, and the hydrophilicity of the sulfonic acid groups, being ionic substituents, generates an improvement in the stability of the aqueous pigment dispersion.

These sulfonic acid group-containing acetoacetic acid arylamide-based azo compounds can be synthesized either by introducing sulfo groups into a compound containing the base skeleton using a sulfonation agent such as fuming sulfuric acid, concentrated sulfuric acid, or chlorosulfuric acid, or by converting a base containing sulfo groups into a diazonium salt, and then conducting a diazo coupling reaction with an acetoacetic acid arylamide-based coupler. Regardless of which method is used, in those cases where the sulfonic acid group-containing acetoacetic acid arylamide-based monoazo compound is obtained by synthesis, the reaction conditions are preferably controlled so as to minimize by-products and unreacted residues. These by-products and unreacted residues can be removed by purification, down to a level that has no significant effect on the characteristics of the aqueous pigment dispersion of the present invention, but from the viewpoints of ease of operation and cost, a method that uses a diazo coupling reaction with a sulfonic group-containing base is preferred.

The sulfonic acid group-containing acetoacetic acid arylamide-based azo compound of the present invention can use compounds represented by either of the aforementioned general structural formulas (1) or (2), but the use of a compound represented by a general formula (7) shown below is preferred.

aqueous pigment dispersion exhibits particularly superior image density and durability performance when used on plain paper.

The quantity used of the sulfonic acid group-containing acetoacetic acid arylamide-based azo compound of the present invention is preferably a minor component relative to the C.I. Pigment Yellow 74, and specifically, ensuring that the weight ratio between the C.I. Pigment Yellow 74 and the sulfonic acid group-containing acetoacetic acid arylamide-based azo compound falls within a range from 80:20 to 99:1 is preferred from the viewpoint of the hue, the coloration, and the stability within an accelerated deterioration test conducted within a heated atmosphere, of printed material generated using an ink-jet ink prepared from the aqueous pigment dispersion of the present invention.

If the weight ratio between the C.I. Pigment Yellow 74 and the sulfonic acid group-containing acetoacetic acid arylamide-based azo compound of the present invention (Yellow 74/azo compound) falls below a ratio of 80/20, and the proportion of the sulfonic acid group-containing acetoacetic acid arylamide-based azo compound is increased, then the coloration of the C.I. Pigment Yellow 74 tends to more readily hindered, whereas if the ratio (Yellow 74/azo compound) exceeds 99/1, and the proportion of the sulfonic acid group-containing acetoacetic acid arylamide-based azo compound is reduced, the effect of the compound on the stability within an accelerated deterioration test carried in a heated atmosphere of an ink-jet ink prepared from the aqueous pigment dispersion becomes less obvious.

In those cases here the sulfonic acid group-containing acetoacetic acid arylamide-based azo compound of the present invention is synthesized by a diazo coupling reaction, the diazo coupling reaction can be conducted within the same system as that used for the synthesis of the C.I. Pigment Yellow 74 used in the aqueous pigment dispersion, at the same time as the diazo coupling reaction of the C.I. Pigment Yellow 74. For example, the sulfonic acid group-containing acetoacetic acid arylamide-based azo compound can be prepared during the synthesis of the azo pigment by an azo coupling reaction, by conducting a mixed coupling with the sulfonic acid group-containing base.

By using this method, the same coupler as that used in the synthesis of the C.I. Pigment Yellow 74 is used, meaning the affinity between the sulfonic acid group-containing acetoacetic acid arylamide-based azo compound and the pigment is excellent, which has a significant effect on improving the stability of the pigment dispersion.

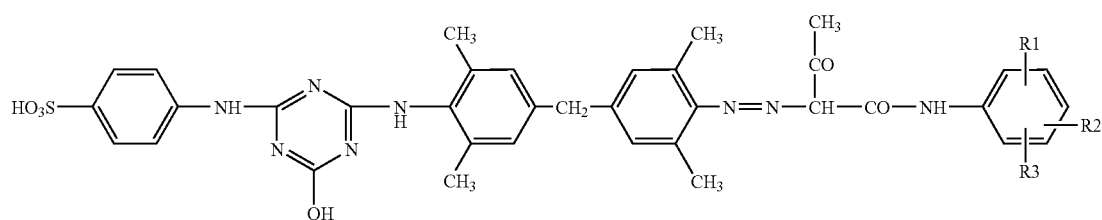
(7)

(wherein, R1, R2 and R3 each represent, independently, a hydrogen atom, methyl group, methoxy group, ethoxy group or chloro group)

In the case where R1 is an orthomethoxy group, and R2 and R3 are hydrogen atoms, an ink-jet ink prepared from the Mixed coupling of the present invention, or synthesis of the aforementioned C.I. Pigment Yellow 74 and sulfonic acid group-containing acetoacetic acid arylamide-based azo compound is preferably conducted using a diazonium salt prepared from 4-nitro-o-anisidine, and a base for the general formula (1) represented by a general formula (4):

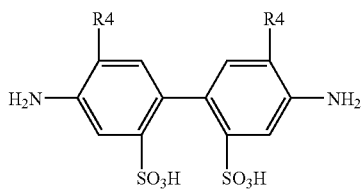

(4)

(wherein, R4 represents a methyl group or methoxy group), and/or a base for the general formula (2) represented by a general formula (5):

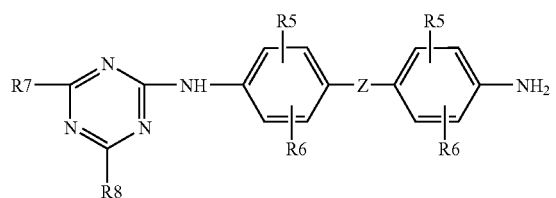

(5)

(wherein, R5 and R6 each represent, independently, a hydrogen atom, methyl group, ethyl group, methoxy group, ethoxy group, or hydroxyl group, at least one of R7 and R8 is a group represented by —NH—Y—SO₃H, Y represents an ethylene group, phenylene group or naphthalene group, and Z represents one of the bivalent linkage groups represented by the aforementioned general formulas (3)), together with a coupler represented by a chemical formula (6).

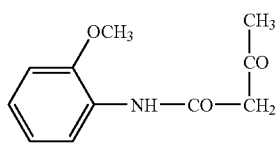

(6)

In the present invention, in those cases where the C.I. Pigment Yellow 74 and the sulfonic acid group-containing acetoacetic acid arylamide-based azo compound are synthesized within the same reaction system, the product containing the mixture of the various compounds can be used as the azo pigment composition, and there is no need to isolate the individual compounds. In such cases, the weight ratio of the present invention between the C.I. Pigment Yellow 74 and the sulfonic acid group-containing acetoacetic acid arylamide-based azo compound is considered to be the theoretical ratio generated as a result of the respective syntheses.

The relative proportions of the colorant, which includes the C.I. Pigment Yellow 74 and the sulfonic acid group-containing acetoacetic acid arylamide-based azo compound of the present invention, and the styrene-acrylic-based resin that is used as the dispersant is preferably selected within a range from colorant/resin=1/0.1 to 1/2. Selecting a ratio within a range from colorant/resin=1/0.1 to 1/1 is even more desirable in terms of ensuring adequate manifestation of the coloring capabilities of the colorant.

Because the resin used in the aqueous pigment dispersion of the present invention contains carboxyl groups derived from acrylic acid and methacrylic acid, neutralization with a basic compound can be used to generate a stable dispersion in water.

Examples of the basic compound used for this purpose include alkali metal hydroxides and low molecular weight organic amine compounds. In particular, in those cases where the aqueous pigment dispersion is used to prepare an ink-jet ink, alkali metal hydroxides such as sodium hydroxide and potassium hydroxide, and alcohol amines such as triethanolamine, diethanolamine and methyldiethanolamine are preferred in terms of factors such as dispersibility, storage stability, the decap characteristics of the ink-jet printer, and the water resistance of the printed image. Of these basic compounds, alkali metal hydroxides typified by potassium hydroxide and sodium hydroxide are particularly preferred, as they contribute to a reduction in the viscosity of the pigment dispersion, thereby improving the ink-jet ink ejecting stability.

When neutralization is conducted using the basic component, the use of a basic component with a neutralization ratio of 50 to 130% relative to the acid number of the styrene-acrylic-based resin of the present invention is preferred, and using a basic component with a neutralization ratio of 50 to 110% is even more desirable in terms of controlling the pH value of the pigment dispersion and the ink-jet ink composition that uses the dispersion.

In the present invention, the neutralization ratio refers to a number represented by the following formula.

Neutralization ratio (%)=((weight of basic compound (g)×56×1,000)/(resin acid number×basic compound equivalence×resin weight (g)))×100

To produce an aqueous pigment dispersion of the present invention, a mixture is prepared containing the aforementioned C.I. Pigment Yellow 74, the aforementioned styrene-acrylic-based resin, the aforementioned basic compound, and water, and this mixture is then dispersed using a dispersion device to prepare an aqueous dispersion.

Conventional dispersion devices can be used for dispersing the pigment. Examples of suitable devices include an ultrasound homogenizer, paint shaker, ball mill, sand mill, sand grinder, dyno-mill, dispermat, SC mill, spike mill, or nanomizer. In devices that use a dispersing medium to effect dispersion, grinding beads of glass, zirconia, alumina, or plastic or the like can be used.

In the step of dispersing the pigment, a water-soluble organic solvent may also be added if required. Examples of this water-soluble organic solvent include alkyl alcohols of 1 to 4 carbon atoms, such as methyl alcohol, ethyl alcohol, n-propyl alcohol, isopropyl alcohol, n-butyl alcohol, sec-butyl alcohol, tert-butyl alcohol, and isobutyl alcohol; amides such as dimethylformamide and dimethylacetamide; ketones or keto alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazolidinone; polyalkylene glycols such as polyethylene glycol and polypropylene glycol; alkylene glycols containing an alkylene group of 2 to 6 carbon atoms, such as ethylene glycol, propylene glycol, butylene glycol, triethylene glycol, 1,2,6-hexanetriol, thiodiglycol, hexylene glycol, and diethylene glycol; glycerol; and lower alcohol ethers of polyhydric alcohols such as ethylene glycol methyl ether, diethylene glycol (ethyl) methyl ether, and triethylene glycol (ethyl) methyl ether.

These wetting agents can be used either alone, or in mixtures of two or more different compounds. In an aqueous pigment dispersion or an ink-jet ink, these wetting agents perform the functions of both wetting agent and drying prevention agent, and a liquid polyhydric alcohol ordinary with a high boiling point, low volatility, and high surface tension, with a boiling point of at least 170° C., and preferably 200° C. or higher is preferred, and glycols such as diethylene glycol and triethylene glycol are particularly desirable.

The quantity added of the water-soluble organic solvent varies depending on the resin, but is preferably no more than 300% by weight relative to the combined weight of the C.I. Pigment Yellow 74 and the acetoacetic acid arylamide-based azo compound, with quantities of no more than 200% by weight being even more desirable.

In the production of an aqueous pigment dispersion of the present invention, a more efficient production of the aqueous pigment dispersion can be achieved by first conducting high-viscosity kneading of a high solid fraction mixture containing the C.I. Pigment Yellow 74, the sulfonic acid group-containing acetoacetic acid arylamide-based azo compound, and the styrene-acrylic-based resin from those components contained within the aqueous pigment dispersion.

In this case, the addition of the basic compound may be performed during the dispersing process following the kneading, although adding the basic compound during the kneading process further facilitates the dispersing process in water. If the wetting agent is added during the kneading process then the resin is more easily swollen, enabling the kneading to proceed more effectively and efficiently, which is desirable.

As the wetting agent, of the water-soluble organic solvents listed above, a polyhydric alcohol can be employed particularly favorably.

The concentrations of the various components within an aqueous pigment dispersion of the present invention can be set appropriately within concentration ranges that enable preparation of the targeted ink-jet ink. If factors such as operating efficiency and cost are considered when an ink-jet ink is prepared by post-processing using the aqueous pigment dispersion, then the concentration of the aforementioned azo pigment within the aqueous pigment dispersion of the present invention is preferably within a range from 2 to 25% by weight, and even more preferably from 10 to 20% by weight. The respective concentrations within the aqueous pigment dispersion of the present invention of the sulfonic acid group-containing acetoacetic acid arylamide-based azo compound, the styrene-acrylic-based resin, and the basic component are selected appropriately from the aforementioned ratios relative to the quantity of the azo pigment.

In order to produce an aqueous ink composition for ink-jet recording using an aqueous pigment dispersion of the present invention as the primary component, the pigment concentration and viscosity are adjusted, and various additives may also be added.

These various added components can be selected from conventional compounds known to be suitable for ink-jet inks. Examples of such compounds include viscosity ajusters, penetrants, surfactants, pH ajusters, drying prevention agents, preservatives and mold-proofing agents, chelating agents, ultraviolet absorbers, antioxidants, antifoaming agents, and kogation prevention agents.

Penetrants can be used for controlling the penetration of the ink-jet ink into the recording medium and the dot diameter of the printed ink on the recording medium. Examples of water-soluble organic solvents that exhibit penetration qualities include lower alcohols such as ethanol and isopropyl alcohol, ethylene oxide adducts of alkyl alcohols, such as ethylene glycol hexyl ether and diethylene glycol butyl ether, and propylene oxide adducts of alkyl alcohols, such as propylene glycol propyl ether.

Surfactants can be used for ajusting the surface tension of the ink-jet ink, controlling the ejecting stability and the penetration of the ink into the paper during printing, controlling bleeding and offsetting of the ink-jet ink, and controlling the drying speed of the ink. Specifically, conventional anionic, cationic, nonionic and amphoteric surfactants can be used.

pH ajusters control the pH value of the aqueous pigment dispersion or the ink-jet ink, and various acidic or basic compounds can be used as required, in addition to the basic component that is used within the aqueous pigment dispersion of the present invention.

Drying prevention agents can be used for reducing the occurrence of nozzle clogging caused by the aqueous pigment dispersion or ink-jet ink, and concentration variations, precipitation or sedimentation caused by evaporation of the water content. Specifically, polyhydric alcohols such as ethylene glycol, diethylene glycol, propylene glycol, 1,3-propanediol, triethylene glycol, polyethylene glycol, glycerol, tetraethylene glycol, dipropylene glycol, 1,2-hexanediol, and 2,4,6-hexanetriol are preferred.

Preservatives and mold-proofing agents can be used for reducing ejecting faults caused by the occurrence of mold or bacteria within the aqueous pigment dispersion or ink-jet ink. Specifically, compounds such as sodium dehydroacetate, sodium benzoate, sodium pyridinethione-1-oxide, zinc pyridinethione-1-oxide, 1,2-benzisothiazolin-3-one, and the amine salt of 1-benzisothiazolin-3-one.

An aqueous pigment dispersion of the present invention, following steps for blending various additives and controlling the concentration and the like can be used favorably as an ink-jet ink for conventional on-demand systems such as piezo systems or thermal systems, and exhibits extremely stable ink ejecting properties in printers using any of these systems. In particular, a stable ejecting can be obtained even as an ink-jet ink within thermal systems, which have a large effect on the ink ejecting properties.

EXAMPLES

As follows is a more detailed description of the present invention based on a series of examples, although the present invention is in no way restricted by the examples presented below. In the following description of the examples, unless stated otherwise, the units "parts" refer to "parts by weight".

Preparation of Resin Solutions

To 10 parts of a resin formed from styrene (77 parts), acrylic acid (10 parts), and methacrylic acid (13 parts), with an acid number of 150 mgKOH/g, a weight average molecular weight of 7,500, and a glass transition temperature of 107° C. were added 10 parts of MEK, 1.07 parts of sodium hydroxide, and 60 parts of purified water, and following stirring, the MEK was removed by distillation under reduced pressure (70° C., 150 Pa), yielding a resin solution (D-1) with a solid fraction of 22% by weight.

To 10 parts of a resin formed from styrene (77 parts), acrylic acid (10 parts), and methacrylic acid (13 parts), with an acid number of 150 mgKOH/g, a weight average molecular weight of 11,500, and a glass transition temperature of 107° C. were added 10 parts of MEK, 1.5 parts of potassium hydroxide, and 60 parts of purified water, and following stirring, the MEK was removed by distillation under reduced pressure (70° C., 150 Pa), yielding a resin solution (D-2) with a solid fraction of 22% by weight.

To 10 parts of a resin formed from styrene (77 parts), acrylic acid (10 parts), and methacrylic acid (13 parts), with an acid number of 150 mgKOH/g, a weight average molecular weight of 5,000, and a glass transition temperature of 107° C. were added 10 parts of MEK, 1.07 parts of sodium hydroxide, and 60 parts of purified water, and following stirring, the MEK was removed by distillation under reduced pressure (70° C., 150 Pa), yielding a resin solution (D-3) with a solid fraction of 22% by weight.

To 10 parts of a resin formed from styrene (77 parts), acrylic acid (10 parts), and methacrylic acid (13 parts), with an acid number of 150 mgKOH/g, a weight average molecular weight of 20,000, and a glass transition temperature of 107° C. were added 10 parts of MEK, 1.07 parts of sodium hydroxide, and 60 parts of purified water, and following stirring, the MEK was removed by distillation under reduced pressure (70° C., 150 Pa), yielding a resin solution (D-4) with a solid fraction of 22% by weight.

To 10 parts of a resin formed from styrene (45 parts), methyl methacrylate (32 parts), acrylic acid (10 parts), and methacrylic acid (13 parts), with an acid number of 150 mgKOH/g, a weight average molecular weight of 12,000, and a glass transition temperature of 109° C. were added 10 parts of MEK, 1.5 parts of potassium hydroxide, and 60 parts of purified water, and following stirring, the MEK was removed by distillation under reduced pressure (70° C., 150 Pa), yielding a resin solution (D-5) with a solid fraction of 22% by weight.

Synthesis Example 1

Synthesis of Yellow Pigment Composition Y-1

Synthesis of a Diazo Solution

To a mixed solution containing 700 parts of water and 315 parts of 35% hydrochloric acid were added and stirred 181.4 parts of 4-nitro-o-anisidine and 68.8 parts of a compound (8) shown below, and following cooling by the addition of 600 parts of ice, 188 parts of a 46.8% aqueous solution of sodium nitrite was added, the resulting mixture was stirred for one hour at no more than 10° C., any excess nitrous acid was eliminated using sulfamic acid, and the resulting solution was filtered, yielding a diazo solution.

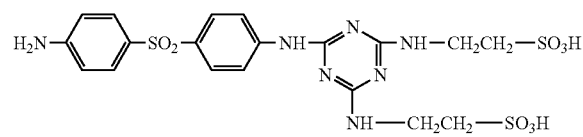

(8)

Synthesis of a Coupler Solution 100 parts of sodium acetate was dissolved in 8900 parts of water, 256.7 parts of o-acetoacetanisidide was added, 185 parts of 30% caustic soda was then added and dissolved, and 80% acetic acid was added dropwise to alter the pH to 6, thus forming a coupler solution.

Coupling Reaction

The above diazo solution was added dropwise at 25° C. to the above coupler solution, and following reaction, the resulting solution was left to age at 90° C. for 30 minutes. The product was then filtered, washed with water, dried and ground, yielding 495 parts of a yellow pigment composition (Y-1).

This yellow pigment composition (Y-1) is calculated as being a mixture of C.I. Pigment Yellow 74, and an acetoacetic acid arylamide-based azo compound (9), which is a compound of the general formula (2) wherein R1 is a methoxy group, R2, R3, R5 and R6 are hydrogen atoms, R7 and R8 represent —NH—$CH_2CH_2$—$SO_3H$, and Z represents a —$SO_2$—linkage group, with the two compounds existing in proportions equivalent to a weight ratio of 81:19.

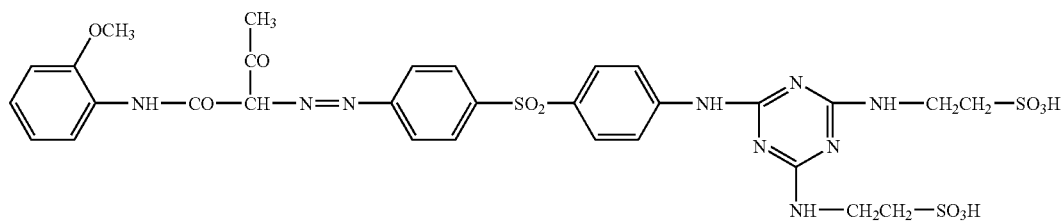

(9)

Synthesis Example 2

Synthesis of Yellow Pigment Composition Y-2

With the exceptions of altering the quantity of 4-nitro-o-anisidine to 185.5 parts, and using 45.3 parts of a compound (10) shown below instead of the 68.8 parts of the aforementioned compound (8), 472 parts of a yellow pigment composition (Y-2) were obtained in the same manner as the synthesis example 1.

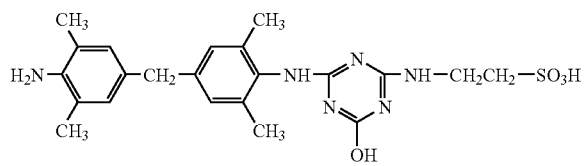

(10)

This yellow pigment composition (Y-2) is calculated as being a mixture of C.I. Pigment Yellow 74, and an acetoacetic acid arylamide-based azo compound (11), which is a compound of the general formula (2) wherein R1 is a methoxy group, R2 and R3 are hydrogen atoms, R5 and R6 are methyl groups, R7 represents —NH—$CH_2CH_2$—$SO_3H$, R8 is 10 a hydroxyl group, and Z represents a —$CH_2$—linkage group, with the two compounds existing in proportions equivalent to a weight ratio of 87:13.

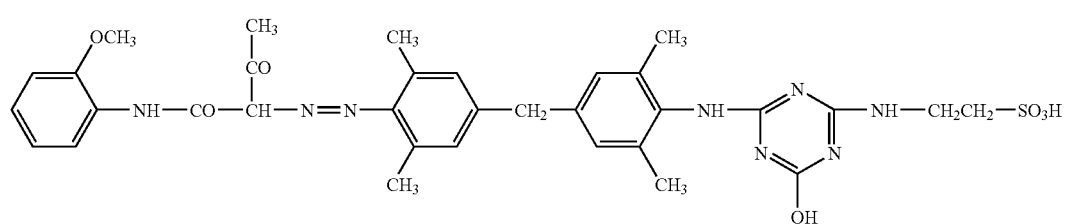

(11)

Synthesis Example 3

Synthesis of Yellow Pigment Composition Y-3

Synthesis of a Compound 13

To a mixed solution containing 400 parts of water and 58.4 parts of 35% hydrochloric acid was added and stirred 83.2 parts of a compound (12) shown below, and following cooling by the addition of 500 parts of ice, 26 parts of a 46.8% aqueous solution of sodium nitrite was added, the resulting mixture was stirred for one hour at no more than 10° C., any excess nitrous acid was eliminated using sulfamic acid, and the resulting solution was filtered, yielding a diazo solution.

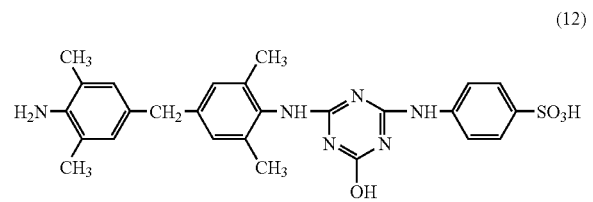 [SMILES: Cc1cc(Cc2cc(C)c(Nc3nc(O)nc(Nc4ccc(S(=O)(=O)O)cc4)n3)c(C)c2)cc(C)c1N]

(12)

Meanwhile, 76 parts of 30% caustic soda was added to 1200 parts of water, 38 parts of o-chloroacetoacetanilide was added and dissolved, and 80% acetic acid was added dropwise to alter the pH to 6, thus forming a coupler solution.

The above diazo solution was added dropwise at 25° C. to the above coupler solution, and following reaction by stirring for 60 minutes, the resulting solution was left to age at 80° C. for 30 minutes. The product was then filtered and washed with water, yielding 264 parts of a paste of a compound (13) with a solid fraction of 36.5%.

Synthesis of a Diazo Solution

To a mixed solution containing 700 parts of water and 315 parts of 35% hydrochloric acid were added and stirred 197.6 parts of 4-nitro-o-anisidine and 8.9 parts of 3,3'-dimethyl-4,4'-diaminobiphenyl-6,6'-disulfonic acid, and following cooling by the addition of 600 parts of ice, 188 parts of a 46.8% aqueous solution of sodium nitrite was added, the resulting mixture was stirred for one hour at no more than 10° C., any excess nitrous acid was eliminated using sulfamic acid, and the resulting solution was filtered, yielding a diazo solution.

Synthesis of a Coupler Solution 100 parts of sodium acetate was dissolved in 8900 parts of water, 256.7 parts of o-acetoacetanisidide was added, 185 parts of 30% caustic soda was then added and dissolved, and 80% acetic acid was added dropwise to alter the pH to 6, thus forming a coupler solution.

Coupling Reaction

The above diazo solution was added dropwise at 25° C. to the above coupler solution, and following reaction, 264 parts of the previously synthesized paste of the aforementioned compound (13) was added, and the resulting mixture was allowed to age at 80° C. for 30 minutes under constant stirring. The product was then filtered, washed with water, dried and ground, yielding 470 parts of a yellow pigment composition (Y-3).

This yellow pigment composition (Y-3) is calculated as being a mixture of C.I. Pigment Yellow 74, the acetoacetic acid arylamide-based azo compound (13), which is a compound of the general formula (2) wherein R1 is a chloro group, R2 and R3 are hydrogen atoms, R5 and R6 are methyl groups, R7 represents —NH—Y—SO$_3$H (wherein Y is a phenylene group), R8 is a hydroxyl group, and Z represents a —CH$_2$—linkage group, and a compound (14), which is a compound of the general formula (1) wherein R1 is a methoxy group, R2 and R3 are hydrogen atoms, and R4 is a methyl group, with the three compounds existing in proportions equivalent to a weight ratio of 83:12:5.

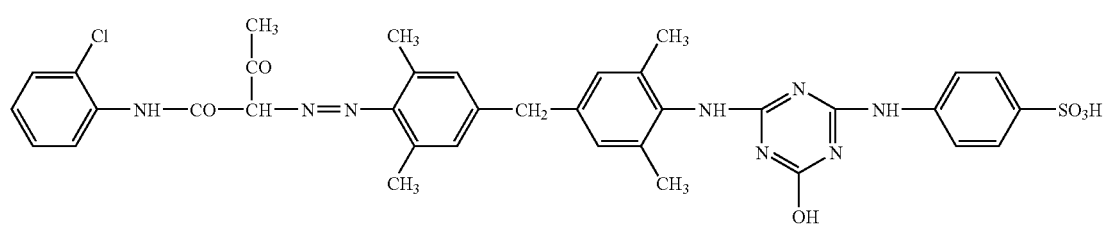

(13)

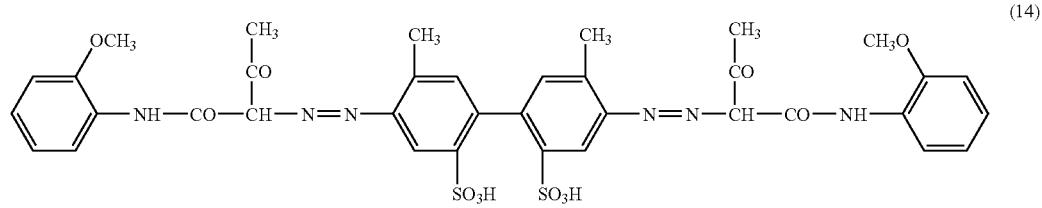

(14)

Synthesis Example 4

Synthesis of Yellow Pigment Composition Y-4

With the exceptions of altering the quantity of 4-nitro-o-anisidine to 168.2 parts, and using 12.4 parts of the compound (12) instead of the 68.8 parts of the aforementioned compound (8), 470 parts of a yellow pigment composition (Y-4) were obtained in the same manner as the synthesis example 1.

This yellow pigment composition (Y-4) is calculated as being a mixture of C.I. Pigment Yellow 74, and an acetoacetic acid arylamide-based azo compound (15), which is a compound of the structural formula (2) wherein R1 is a methoxy group, R2 and R3 are hydrogen atoms, R5 and R6 are methyl groups, R7 represents —NH—$C_6H_4$—$SO_3H$, R8 is a hydroxyl group, and Z represents a —$CH_2$—linkage group, with the two compounds existing in proportions equivalent to a weight ratio of 96:4.

Example 1

10 parts of a commercially available C.I. Pigment Yellow 74 (product name: "Fast Yellow 7410", manufactured by Sanyo Color Works Ltd.), 18.2 parts of the resin solution (D-1), 20 parts of diethylene glycol, 18.5 parts of purified water, and 400 parts of 1.25 mm diameter zirconia beads were combined and then shaken for 4 hours using a paint shaker (product name: "Test Dispersion Apparatus No. 488", manufactured by Toyo Seiki Seisaku-Sho, Ltd.), thereby yielding an aqueous pigment dispersion (A).

Example 2

With the exception of replacing the resin solution (D-1) from the example 1 with the resin solution (D-2), an aqueous pigment dispersion (B) was obtained in the same manner as the example 1.

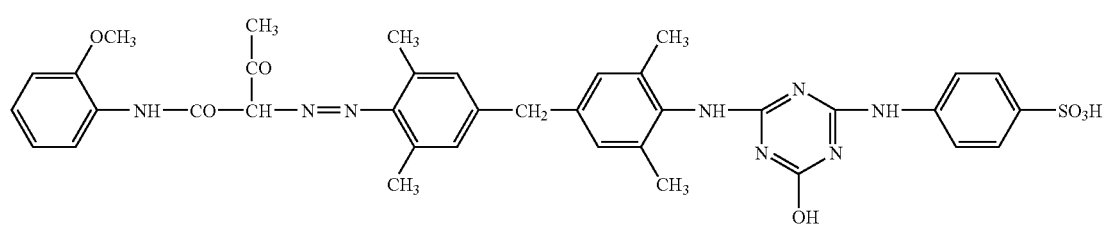

(15)

Synthesis Example 5

Synthesis of Yellow Pigment Composition Y-5

With the exception of using 22.4 parts of 4-aminotoluene-3-sulfonic acid instead of the 68.8 parts of the compound (8), 446 parts of a yellow pigment composition (Y-5) were obtained in the same manner as the synthesis example 1.

This yellow pigment composition (Y-5) is calculated as being a mixture of C.I. Pigment Yellow 74, and a low molecular weight acetoacetic acid arylamide-based azo compound (16) different from the aforementioned general formulas (1) and (2), with the two compounds existing in proportions equivalent to a weight ratio of 90:10.

Example 3

With the exception of replacing the 10 parts of C.I. Pigment Yellow 74 from the example 1 with 10 parts of the yellow pigment composition (Y-1) obtained in the synthesis example 1, an aqueous pigment dispersion (C) was obtained in the same manner as the example 1.

Example 4

With the exception of replacing the 10 parts of C.I. Pigment Yellow 74 from the example 1 with 10 parts of the yellow pigment composition (Y-2) obtained in the synthesis example 2, an aqueous pigment dispersion (D) was obtained in the same manner as the example 1.

Example 5

With the exceptions of replacing the 10 parts of C.I. Pigment Yellow 74 from the example 1 with 10 parts of the yellow pigment composition (Y-3) obtained in the synthesis example 3, and replacing the 18.2 parts of the resin solution (D-1) with 18.2 parts of the resin solution (D-2), an aqueous pigment dispersion (E) was obtained in the same manner as the example 1.

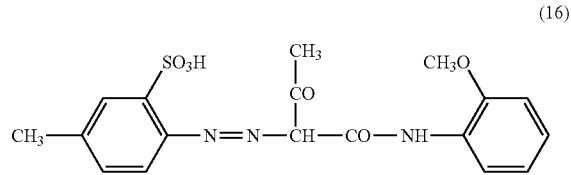

(16)

Example 6

With the exceptions of replacing the 10 parts of C.I. Pigment Yellow 74 from the example 1 with 10 parts of the yellow pigment composition (Y-4) obtained in the synthesis example 4, and replacing the 18.2 parts of the resin solution (D-1) with 18.2 parts of the resin solution (D-2), an aqueous pigment dispersion (F) was obtained in the same manner as the example 1.

Example 7

With the exceptions of replacing the 10 parts of C.I. Pigment Yellow 74 from the example 1 with 10 parts of the yellow pigment composition (Y-5) obtained in the synthesis example 5, and replacing the 18.2 parts of the resin solution (D-1) with 18.2 parts of the resin solution (D-2), an aqueous pigment dispersion (G) was obtained in the same manner as the example 1.

Comparative Example 1

With the exception of replacing the 10 parts of C.I. Pigment Yellow 74 from the example 1 with 10 parts of C.I. Pigment Yellow 93 (product name: "Cromophtal Yellow 3GNP", manufactured by Ciba Specialty Chemicals Ltd.), an aqueous pigment dispersion (H) was obtained in the same manner as the example 1.

Comparative Example 2

With the exception of replacing the 10 parts of C.I. Pigment Yellow 74 from the example 1 with 10 parts of C.I. Pigment Yellow 147 (product name: "Cromophtal Yellow AGR", manufactured by Ciba Specialty Chemicals Ltd.), an aqueous pigment dispersion (I) was obtained in the same manner as the example 1.

Comparative Example 3

With the exception of replacing the 10 parts of C.I. Pigment Yellow 74 from the example 1 with 10 parts of C.I. Pigment Yellow 128 (product name: "Cromophtal Yellow 8GN", manufactured by Ciba Specialty Chemicals Ltd.), an aqueous pigment dispersion (J) was obtained in the same manner as the example 1.

Comparative Example 4

With the exception of replacing the 18.2 parts of the resin solution (D-1) from the example 3 with 18.2 parts of the resin solution (D-3), an aqueous pigment dispersion (K) was obtained in the same manner as the example 3.

Comparative Example 5

With the exception of replacing the 18.2 parts of the resin solution (D-1) from the example 3 with 18.2 parts of the resin solution (D-4), an aqueous pigment dispersion (L) was obtained in the same manner as the example 3.

Comparative Example 6

With the exception of replacing the 18.2 parts of the resin solution (D-1) from the example 3 with 18.2 parts of the resin solution (D-5), an aqueous pigment dispersion (M) was obtained in the same manner as the example 3.

The respective compositions of the examples 1 to 7 and comparative examples 1 to 6 described above are shown in Table 1.

TABLE 1

|  | Resin composition St/AA/MAA/other | Weight average molecular weight | Acid number | Glass transition temperature (° C.) | Yellow pigment | Pigment dispersant introduced by mixed coupling |
|---|---|---|---|---|---|---|
| Example 1 | 77/10/13 | 7,500 | 150 | 107 | P.Y. 74 | |
| Example 2 | 77/10/13 | 7,500 | 150 | 107 | P.Y. 74 | |
| Example 3 | 77/10/13 | 11,500 | 150 | 107 | P.Y. 74 | Chemical formula (9) |
| Example 4 | 77/10/13 | 7,500 | 150 | 107 | P.Y. 74 | Chemical formula (11) |
| Example 5 | 77/10/13 | 7,500 | 150 | 107 | P.Y. 74 | Chemical formulas (13), (14) |
| Example 6 | 77/10/13 | 11,500 | 150 | 107 | P.Y. 74 | Chemical formula (15) |
| Example 7 | 77/10/13 | 11,500 | 150 | 107 | P.Y. 74 | Chemical formula (16) |
| Comparative example 1 | 77/10/13 | 7,500 | 150 | 107 | P.Y. 93 | |
| Comparative example 2 | 77/10/13 | 7,500 | 150 | 107 | P.Y. 147 | |
| Comparative example 3 | 77/10/13 | 7,500 | 150 | 107 | P.Y. 128 | |
| Comparative example 4 | 77/10/13 | 5,000 | 150 | 107 | P.Y. 74 | |
| Comparative example 5 | 77/10/13 | 20,000 | 150 | 107 | P.Y. 74 | |
| Comparative example 6 | 45/10/13/32 | 12,000 | 150 | 109 | P.Y. 74 | |

The examples 1 to 7 and comparative examples 1 to 6 with the compositions shown above were evaluated using the test methods described below.

Dispersibility Test

The volumetric average particle size of the aqueous pigment dispersions obtained in the examples 1 to 7 and the comparative examples 1 to 6 were measured using a "Microtrac UPA-150" analyzer manufactured by Leeds & Northrop Co., Ltd. The results are shown in Table 2.

Storage Stability Accelerated Test 33.3 parts of each of the aqueous pigment dispersions of the examples 1 to 7 and the comparative examples 1 to 6 was blended with 8 parts of triethylene glycol monobutyl ether and 58.7 parts of purified water to prepare samples for conducting accelerated storage stability tests, and each sample was sealed inside a glass container and heated at 70° C. for one week, and variations in the viscosity and particle size distribution over the course of the heating were measured. The viscosity was measured using a "TVE-20L" apparatus manufactured by Tokimec Inc. The results are shown in Table 2.

Piezo Jet Ejecting Properties Test

To 20 parts of each of the aqueous pigment dispersions obtained in the examples 1 to 7 and the comparative examples 1 to 6 were added 10 parts of glycerol, 5 parts of propylpropylene glycol, and 65 parts of purified water, and following mixing, the solutions were filtered through a 0.5 μm membrane filter, thereby yielding aqueous pigment ink-jet inks for testing the initial ejecting properties.

Portions of these ink-jet inks were sealed in separate glass containers and subjected to 4 repetitions of a temperature cycle involving 4 hours at 70° C. and 4 hours at −20° C., thereby yielding ink-jet inks for testing the ejecting stability after temperature cycling.

These two types of ink-jet inks were subjected to test printing onto "4024 paper" manufactured by Xerox Corporation, using a piezo-type ink-jet printer (product name: "EM-900C", manufactured by Seiko Epson Corporation). The results are shown in Table 3.

Lightfastness Test

Using each of the aqueous pigment ink-jet inks prepared from the aqueous pigment dispersions of the examples 1 to 7

TABLE 2

| Example | Aqueous pigment dispersion | Dispersibility | | Storage stability (after 1 week at 70° C.) | | |
|---|---|---|---|---|---|---|
| | | Viscosity (mPa·s) | Volumetric average particle size (nm) | Viscosity (mPa·s) | Volumetric average particle size (nm) | Stability |
| Example 1 | (A) | 2.6 | 134 | 2.7 | 82 | B |
| Example 2 | (B) | 2.7 | 142 | 2.8 | 96 | B |
| Example 3 | (C) | 2.5 | 120 | 2.5 | 105 | A |
| Example 4 | (D) | 2.5 | 117 | 2.5 | 108 | A |
| Example 5 | (E) | 2.6 | 114 | 2.5 | 93 | A to B |
| Example 6 | (F) | 2.4 | 107 | 2.4 | 106 | A |
| Example 7 | (G) | 2.5 | 118 | 2.6 | 183 | B to C |
| Comparative example 1 | (H) | 2.6 | 120 | 4.0 | 438 | D, precipitate |
| Comparative example 2 | (I) | 3.5 | 115 | 6.9 | 241 | D, precipitate |
| Comparative example 3 | (J) | 3.4 | 151 | 4.4 | 193 | C |
| Comparative example 4 | (K) | 2.4 | 116 | 2.7 | 141 | C |
| Comparative example 5 | (L) | 2.8 | 160 | 2.8 | 154 | D, precipitate |
| Comparative example 6 | (M) | 3.2 | 115 | 4.9 | 125 | D |

The aqueous pigment dispersions of the examples 1 through 6 exhibited minimal variation in viscosity or volumetric average particle diameter on heating, indicating favorable dispersibility and storage stability. The aqueous pigment dispersions of the examples 3 through 6 were particularly favorable, exhibiting good retention of their small volumetric average particle diameter values following heating. The example 7 showed an increase in the volumetric average particle size following heating, although the size was still less than 200 nm, and because there was no increase in viscosity, the increase in particle diameter does not impede ink ejecting. The comparative example 3 and comparative example 4 exhibited slight increases in the volumetric average particle diameter, but in contrast to the examples, the viscosity showed an increase of 10% or more, indicating the possibility of an increase in viscosity over time. The comparative example 1, comparative example 2, comparative example 5, and comparative example 6 suffered from either an increase in viscosity or precipitation, and both the dispersibility and storage stability were poor.

and comparative examples 1 to 6 for the purposes of testing the initial ejecting properties, a solid printed image was prepared on "4024 paper" manufactured by Xerox Corporation. The color difference ΔE in this image upon conducting a lightfastness test involving irradiation of the image for 100 hours using a xenon lamp (product name: Suntest CPS, manufactured by Heraeus GmbH) was measured using a color difference system "Sigma-80" manufactured by Nippon Denshoku Industries Co., Ltd. The results of the evaluations are shown in Table 3.

Water Resistance Test

Using each of the aqueous pigment ink-jet inks prepared from the aqueous pigment dispersions of the examples 1 to 7 and comparative examples 1 to 6 for the purposes of testing the initial ejecting properties, a text printed image was prepared on "4024 paper" manufactured by Xerox Corporation. Immediately after printing, the image was immersed gently into purified water at room temperature for a period of one hour, and the degree of image bleeding in the wet printed material was evaluated visually. In the case of the printed materials from the examples 1, 2 and 6, and the comparative example 5, absolutely no bleeding was observed, whereas in the printed materials from the examples 3 to 5, a very slight level of yellow spreading was noticed around the peripheral portions of the image. The results of the evaluations are shown in Table 3.

Coloration Test

Using the same inks as above, solid image printing was conducted onto "4024 paper" manufactured by Xerox Corporation using a piezo-type ink-jet printer (product name: "EM-900C", manufactured by Seiko Epson Corporation), and the coloration was compared visually. The images produced using the inks prepared from the aqueous pigment dispersions obtained in the examples 1 to 6 exhibited favorable image density when compared with the printed image prepared using the yellow dye-type ink loaded in the EM-900C manufactured by Seiko Epson Corporation. The results of the evaluations are shown in Table 3.

Thermal Ink-Jet Discharge Characteristics Test

To the aqueous pigment dispersions obtained in the examples 1 to 7 and the comparative examples 1 to 6 respectively were added 3 parts of glycerol, 8 parts of triethylene glycol monobutyl ether, 8 parts of 2-pyrrolidinone, 0.2 parts of the surfactant "Surfynol 420" manufactured by Air Products and Chemicals Inc., and 60.8 parts of purified water, and following mixing, the solutions were filtered through a 1 μm membrane filter, thereby yielding aqueous pigment ink-jet inks for testing the thermal ink-jet ejecting properties. Subsequently, each of these ink-jet inks was loaded into a thermal-type ink-jet printer (product name: BJ360) manufactured by Canon Inc., and an initial ejecting test was conducted by printing 20 consecutive copies of a gradation pattern and solid printed image onto A4 glossy paper which is commercially available, and which is special ink-jet paper manufactured by Seiko Epson Inc. In addition, the remaining ink was sealed inside a glass container and heated at 70° C. for a period of two weeks, and a ejecting stability test after heating was then conducted by carrying out another print test using the thermal-type ink-jet printer (product name: BJ360) manufactured by Canon Inc. Once again, 20 consecutive copies of a gradation pattern and solid printed image were printed onto A4 glossy paper, which is commercially available, and which is special ink-jet paper manufactured by Seiko Epson Inc.

The aqueous pigment ink-jet inks obtained in the examples 1 to 7 exhibited stable ejecting properties, no ink smudging occurred even when the printed surface was touched shortly after printing, and a smooth, high quality image was obtained with minimal distortion of the printed image. The aqueous pigment ink-jet inks obtained in the comparative examples 1 to 6 could not produce a stable ejecting, and even after repeated printer cleaning operations, the initial properties could not be restored. The results of the evaluations are shown in Table 3.

Table 3: Results of Piezo Jet and Thermal Jet Print Tests, and Results of Evaluating Lightfastness and Water Resistance

TABLE 3

| | Piezo jet ejecting properties | | Piezo jet print quality | | | Thermal jet ejecting properties | |
|---|---|---|---|---|---|---|---|
| | Before temperature cycling | After temperature cycling | Coloration | Lightfastness | Water resistance | No heating | After heating |
| Example 1 | B | B *1 | A | B | A | B | B |
| Example 2 | B | B *1 | A | B | A | B | B |
| Example 3 | A | A | A | B | B | B | B |
| Example 4 | A | A | A | B | B | B | B |
| Example 5 | A | A | A | B | B | B | B |
| Example 6 | A | A | A | B | A | B | B |
| Example 7 | A | B *1 | A | B | C | B | B |
| Comparative example 1 | B | D | B | B | B | C | D |
| Comparative example 2 | B | D | C | B | B | C | D |
| Comparative example 3 | A | C | C | B | B | C | D |
| Comparative example 4 | A | D | B | B | C | C | D |
| Comparative example 5 | C | C | C | B | A | D | D |
| Comparative example 6 | C *2 | C *2 | B | B | C | D | D |

The evaluation criteria are described below.

Piezo Jet Ejecting Properties/Thermal Jet Ejecting Properties
A: favorable ejecting, uniform image; B: mostly favorable ejecting, image uniformity restored by conducting cleaning operation; C: ejecting problems; D: abnormal ejecting, distortions, image not restored by conducting cleaning operation.

Coloration A: superior to yellow dye-type ink; B: approximately equivalent; C: slightly inferior Lightfastness A: $\Delta E$ from 0 to 1; B: $\Delta E$ from 2 to 5

Water resistance A: extremely good (no bleeding); B: good (slight bleeding); C: poor (bleeding)

*1: In positions near the start of printing, ejecting was slightly unstable, yielding an image lacking uniformity. Image uniformity was restored by conducted a printer head cleaning operation.

*2: Irregularities in the image quality and unstable ejecting, yielding an image lacking uniformity. Image offset occurred.

In this manner, by using C.I. Pigment Yellow 74, a styrene-acrylic-based resin with the specific structure described above, and a basic compound, an aqueous pigment dispersion is obtained that can be used for producing a well-balanced aqueous pigment ink-jet ink with excellent coloration, storage stability, and ejecting properties. The ink-jet ink also exhibits excellent ejecting stability when used in ink-jet printers, including thermal systems, enabling a high print quality to be achieved. Moreover, by also including a sulfonic acid group-containing acetoacetic acid arylamide compound with a specific structure, an ink-jet ink with even more superior properties can be obtained.

Industrial Applicability

An aqueous pigment dispersion of the present invention exhibits excellent storage stability, and an ink-jet ink that contains such an aqueous pigment dispersion as a primary component exhibits a favorable balance of characteristics, with excellent properties of storage stability, ejecting stability, lightfastness, and color strength, and by using this ink composition, a high quality image with minimal bleeding and excellent water resistance can be printed even on plain paper. In addition, stable ejecting properties can be obtained even when the ink composition is used in a thermal jet-type printer.

The invention claimed is:

1. An aqueous pigment dispersion for an ink-jet ink, comprising
C.I. Pigment Yellow 74,
a styrene-acrylic-based resin with an acid number of 100 to 250 and a glass transition temperature of at least 90° C.,
a sulfonic acid group-containing acetoacetic acid arylamide-based azo compound represented by a general formula (7) shown below:

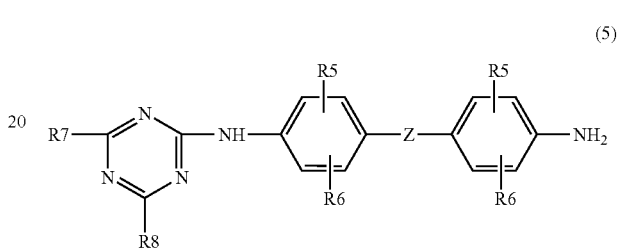

(wherein, R1, R2 and R3 each represent, independently, a hydrogen atom, methyl group, methoxy group, or ethoxy group), and an alkali metal hydroxide, wherein
said styrene-acrylic-based resin comprises at least styrene-based monomer units, acrylic acid monomer units, and methacrylic acid monomer units as component monomer units, a proportion of said styrene-based monomer units relative to a combined total of all monomer units is at least 50% by weight; a sum of said styrene-based monomer units, said acrylic acid monomer units, and said methacrylic acid monomer units, relative to a combined total of all monomer units, is at least 95% by weight; and a weight average molecular weight of said resin is within a range from 7,000 to 15,000.

2. The aqueous pigment dispersion for an ink-jet ink according to claim 1, wherein said alkali metal hydroxide is added in a quantity equivalent to a neutralization ratio of 50 to 130% relative to an acid number of said styrene-acrylic-based resin.

3. The An aqueous pigment dispersion for an ink-jet ink according to claim 1, wherein a weight ratio between said C.I. Pigment Yellow 74 and said sulfonic acid group-containing acetoacetic acid arylamide-based azo compound is within a range from 80:20 to 99:1.

4. The aqueous pigment dispersion for an ink-jet ink according to claim 1, wherein said C.I. Pigment Yellow 74 and said sulfonic acid group-containing acetoacetic acid arylamide-based azo compound are synthesized, by an azo coupling reaction, by conducting a mixed coupling between a diazonium salt formed from 4-nitro-o-anisidine and and/or a base for said general formula (7) represented by a general formula (5):

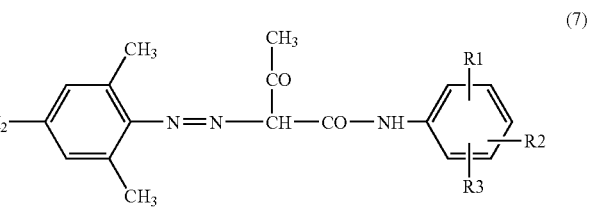

(wherein, R5 and R6 each represent, a methyl group, R7 represents a group represented by —NH—Y—SO$_3$H, Y represents a phenylene group, and Z represents a methylene group), and a coupler represented by a chemical formula (6):

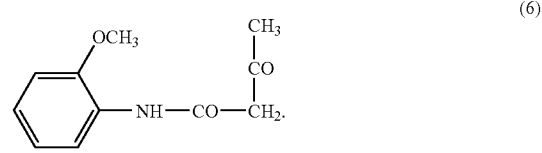

5. An ink-jet ink composition, comprising an aqueous pigment dispersion for an ink-jet ink according to claim 1 as a primary component.

6. The ink composition according to claim 5, wherein said ink-jet ink composition is used in a thermal jet-type ink-jet printer.

7. The aqueous pigment dispersion for an ink-jet ink according to claim 1, wherein the sum of any hydrophilic monomer units of said styrene-acrylic-based resin other than the acrylic acid and methacrylic acid is no more than 2% by weight.

* * * * *